(12) United States Patent
Christiansen et al.

(10) Patent No.: US 9,365,987 B2
(45) Date of Patent: Jun. 14, 2016

(54) PORTABLE REMOTE-CONTROLLED TRAFFIC AND PEDESTRIAN CONTROL SYSTEM

(71) Applicant: SafeTBots, LLC, Everett, WA (US)

(72) Inventors: Brianna J. Christiansen, Everett, WA (US); Matthew S. Christiansen, Everett, WA (US); Erica L. Christiansen, Everett, WA (US); Scott A. Christiansen, Everett, WA (US)

(73) Assignee: SAFETBOTS, LLC, Everett, WA (US)

( * ) Notice: Subject to any disclaimer, the term of this patent is extended or adjusted under 35 U.S.C. 154(b) by 0 days.

(21) Appl. No.: 14/526,784

(22) Filed: Oct. 29, 2014

(65) Prior Publication Data

US 2016/0122956 A1 May 5, 2016

(51) Int. Cl.
| | | |
|---|---|---|
| *G08G 1/0955* | (2006.01) |
| *E01F 9/012* | (2006.01) |
| *E01F 9/011* | (2006.01) |
| *G05D 1/02* | (2006.01) |
| *B60P 3/025* | (2006.01) |
| *B60K 16/00* | (2006.01) |

(52) U.S. Cl.
CPC .............. *E01F 9/0126* (2013.01); *B60K 16/00* (2013.01); *B60P 3/0255* (2013.01); *E01F 9/0111* (2013.01); *G05D 1/0276* (2013.01); *G08G 1/0955* (2013.01); *B60K 2016/003* (2013.01)

(58) Field of Classification Search
CPC .............................. G08G 1/0955; B62D 55/075
USPC ................... 180/6.2, 2.2, 65.1; 901/1, 46
See application file for complete search history.

(56) References Cited

U.S. PATENT DOCUMENTS

| 4,612,996 | A | 9/1986 | Wolf et al. | |
|---|---|---|---|---|
| 5,694,110 | A | 12/1997 | Clifford | |
| 6,118,388 | A * | 9/2000 | Morrison | G08G 1/0955 340/907 |
| 6,522,263 | B2 | 2/2003 | Jones | |
| 7,187,300 | B2 * | 3/2007 | Haney | G08G 1/0175 340/332 |
| 7,388,515 | B2 * | 6/2008 | Hill | E01F 9/0126 340/908 |
| 8,063,795 | B2 | 11/2011 | Ross et al. | |
| 8,195,353 | B2 | 6/2012 | Ichinose et al. | |
| 8,326,469 | B2 * | 12/2012 | Phillips | G05D 1/0088 701/2 |
| 2011/0240382 | A1 * | 10/2011 | Gettings | B62D 55/075 180/9.1 |
| 2012/0101632 | A1 * | 4/2012 | Ha | B25J 9/162 700/248 |

* cited by examiner

*Primary Examiner* — Bryan Evans
(74) *Attorney, Agent, or Firm* — Clark A. Puntigam; Jensen & Puntigam, P.S

(57) ABSTRACT

A movable robotic-like assembly which includes an upper body portion, a base portion and a wheel assembly for supporting the base portion and for moving the movable assembly. Signage is provided in the upper body portion, featuring instructions in a first portion for vehicles, including a stop indication, and signage in a second portion approximately 90° from the previous portion for pedestrians waiting to cross the street in which vehicles are traveling. A motor assembly drives the wheel assembly. A controller separate from the moving assembly remotely controls the movement and the operation of the movable assembly.

28 Claims, 12 Drawing Sheets

PORTABLE REMOTE-CONTROLLED TRAFFIC AND PEDESTRIAN CONTROL SYSTEM

TECHNICAL FIELD

This invention relates generally to systems for controlling traffic and pedestrians, typically for use in crosswalks, and more particularly concerns a remote controlled robot-like system for such traffic and pedestrian control.

BACKGROUND OF THE INVENTION

School zones, particularly those for elementary schools, have crosswalks which utilize young crossing guards, typically fifth and sixth grade students, for controlling vehicle traffic and allowing pedestrians, namely school children and their accompanying adults, to cross streets and proceed toward school as well as away from school. Crossing guards typically wear safety vests and hold flags in order to get the attention of drivers in order to stop vehicle traffic. This can be a potentially dangerous situation, as the crossing guard attempts to control both anxious pedestrians and oncoming vehicle traffic. According to the US Department of Transportation, there are approximately 70,000 deaths per year of pedestrians caused by automobiles. The many distractions, such as the use of cell phones, for drivers make the situation even more tenuous. In addition, there are over 20,000 injuries or deaths per year in work zones caused by vehicles or construction equipment.

It is thus desirable to maintain the safety of pedestrians in pedestrian crossing zones, particularly schools, as well as for workers in work zones. This includes the ability to safely stop and/or control traffic and maintain control over pedestrians.

SUMMARY OF THE INVENTION

Accordingly, the portable, remotely controlled apparatus for control of traffic and/or pedestrians, comprising: a movable assembly which includes an upper body portion and a base portion with a wheel assembly supporting the base portion for movement; signage in the upper body portion, including a first signage portion facing in one direction for vehicles and a second signage portion facing in another direction for pedestrians attempting to cross a street in which vehicles are permitted to travel; a motor assembly for driving the wheel assembly; and a controller separate from the movable assembly for controlling the movement of the moveable assembly remotely.

BEST MODE FOR CARRYING OUT THE INVENTION

Figure 1:
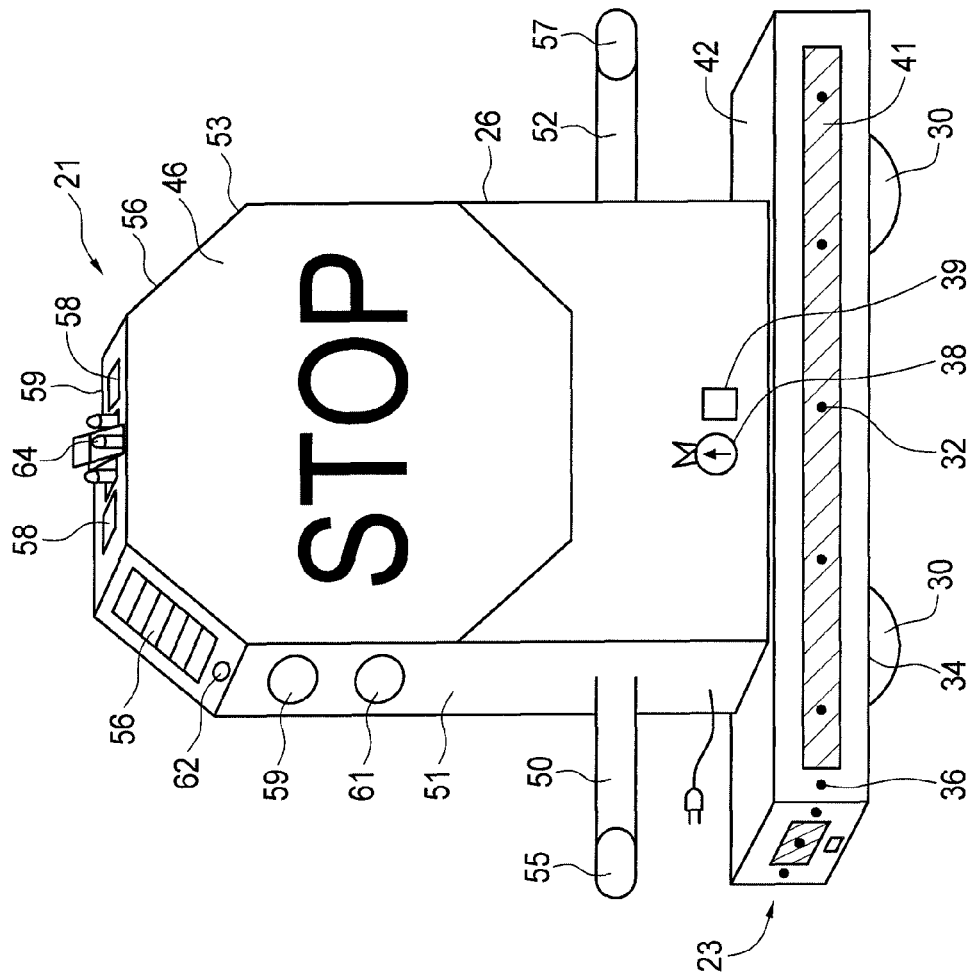
FIGS. 1 and 1A comprise a front view of the traffic and pedestrian management system of the present invention.
Figure 1A:
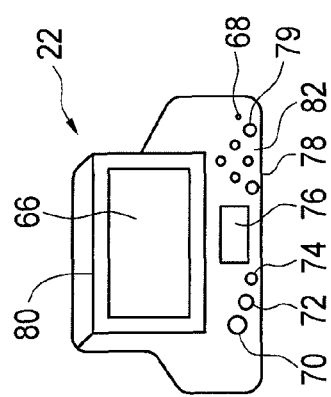

As indicated above, the present invention is directed toward maintaining safety for pedestrians who are crossing streets containing vehicles, such as in school zones, in one embodiment and in another embodiment, the safety of workers in work zones. For both embodiments, the present invention produces enhanced awareness for drivers in school and work zones. FIG. 1 shows a portable traffic and pedestrian management system. The system includes a robot apparatus 21 and a controller 22 which is physically separate from the robot 21. The robot 21 and the controller 22 are both made of a strong, rust-resistant material, including various plastics as well as metal.

The robot 21 includes a base portion 23 and a vertical signage portion 26 which extends upwardly from the base portion. The base contains the mechanical and electronic elements to move and otherwise operate the robot 21. The base 23 includes electrically powered wheels 30 at least at two corners and preferably at each corner thereof. The base further includes sensors 32 for sensing the proximity to various objects, sensors 34 for determining the speed of the wheels 30, sensors 36 for identifying objects which may have been hit by the robot and sensors 38 and 39 for determining the angle of the robot. The base also includes a battery to power the robot (not shown in FIG. 1) and a lockable compartment 42 to store the controller unit 22. The base may include reflective material 41 covering selected portions thereof.

The vertical signage portion includes a variety of elements for communication with pedestrians and vehicles. It includes a large sign 46 which is on both the front and opposing rear sides of the signage portion. The signage portion can include different messages, which may be the word "Stop" for crosswalk usage, or in addition "Slow" or "Workers Ahead", as well as other traffic warning information, for work zones and other uses. The signage meets the US Department of Transportation manual on Uniform Traffic Control Devices (UTCD) and their specifications, and can be configured to switch from one selected message to another, for instance from Stop to Slow, and vise versa.

The vertical signage portion includes two arms 50 and 52 which extend from opposing narrow sides 51 and 53 of the signage portion and can be arranged to extend and retract out of the signage portion. When extended, the arms in the embodiment shown are approximately 18 inches long by 2 inches in diameter, although these dimensions can be varied. The arms include flashing LED lights 55, 57 at the ends thereof. The pedestrian control lights 59 and 61 on the opposing sides of the signage portion can be red and green and are remotely operated by the user with controller 22 to provide a visual cue to pedestrians. When the arms are extended, the lights 55 and 57 automatically turn on, while when the arms are retracted, the lights automatically turn off. The vertical signage portion of the robot further includes solar panels 56 which in the embodiment shown are positioned on each angled side portion.

In the embodiment shown, the base 23 is approximately 33 inches long by 24 inches wide and 13 inches high, although these dimensions can be varied. The signage portion is approximately 9 inches deep and over most of its distance is approximately 24 inches long by 39 inches high. The upper corners of the signage portion are angled. Solar panels 56 are used to maintain battery charge, although the batteries can be charged through an electric connection as well. The signage portion also includes flashing LED lights 58 positioned on the upper surface 59 of the signage portion. The lights 58 can be used conveniently to communicate the presence of the robot.

Remotely activated speaker units 62 operated by the controller can be used to alert pedestrians/workers and motorists and to provide audible instructions to pedestrians when it is safe to cross the street. In addition, there are a number of waterproof night-vision illuminating digital recording cameras 64 positioned on the upper surface of the signage portion. The digital video can be reviewed on the display 66 on the controller, or any other device connected to the internet, such as web browsers or smart phones. The resulting video can be stored on the robot itself, such as in a DVR or an SD memory card or sent to an off-site location in real time via cellular or WiFi communication.

The controller 22 operates at a distance of up to one mile from the robot in the embodiment shown. The controller is hand held by a user, and uses rechargeable batteries for power. The controller has an on/off switch 68, and a joystick 70 for controlling the motion of the robot 22, including forward and reverse directions as well as turning. The controller also includes a microphone 72 and a speaker 74 to communicate audibly with others at the location of the robot and off-site. The controller further has a touch sensitive LCD display 76 for managing the operation as well as the configuration settings for the robot and for viewing live video from cameras 64 on the robot. The controller further has an audible buzzer 78 and vibrator 79 which can be used to notify the operator of various conditions such as the robot being tipped over or at an unacceptable angle, based on input from the gyroscope and accelerometer sensors 38 and 39 on the robot. The controller also can be configured so that the robot can send a message to the controller for the display 76, if the robot encounters an obstruction based on information from proximity sensors 32 or limit switches 36.

The controller has several operating buttons 82 to remotely control the various robot functions which can include but are not limited to the deployment of arms 50, 52, the actuation of lights 55, 57, the signage changed from stop to slow and back, the red stop light 59 and green walk light 61, the warning lights 58 activated and deactivated, cameras 64 and remote raising and lowering the vertical signage portion, as explained below. The controller further has a storage cradle 80 for a smart phone. A smart phone can be used to communicate to a microcontroller in the controller 22 via Bluetooth, Wi-Fi or direct connect.

Figure 2:
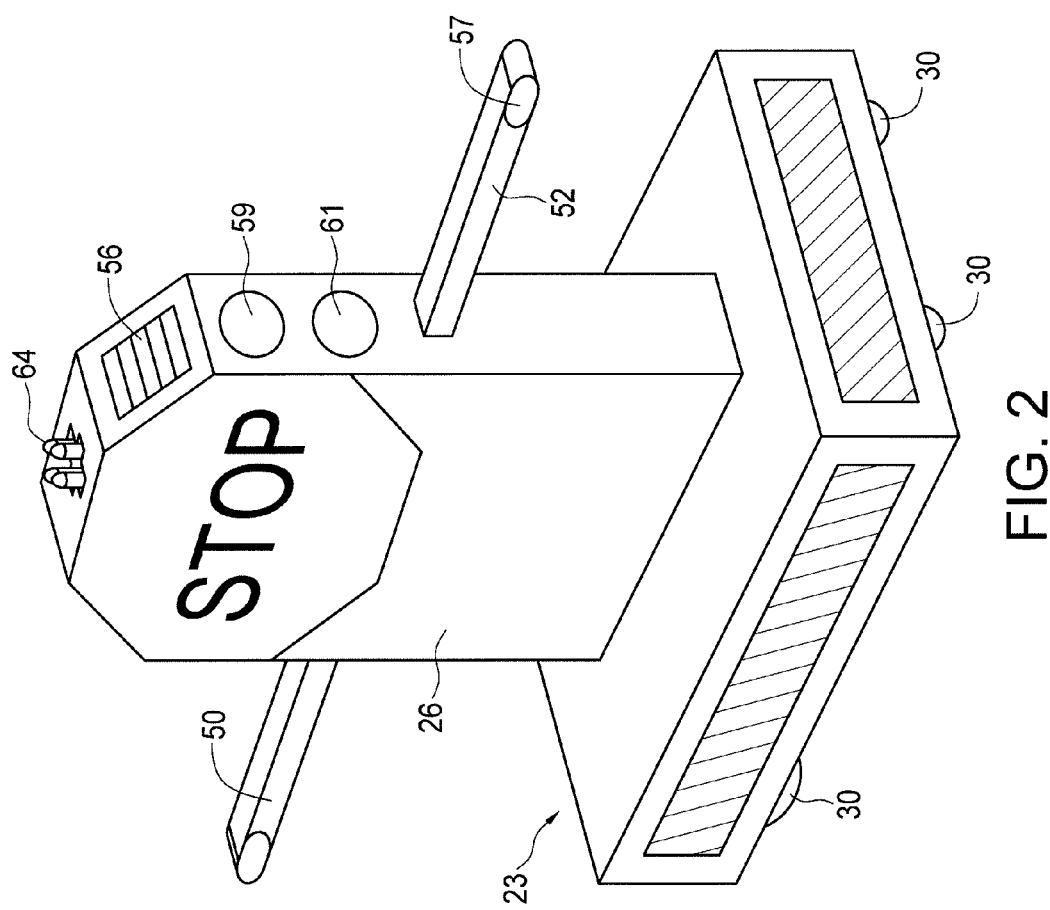
FIG. 2 is a perspective view of a robot portion of the system of FIG. 1.
Figure 3:
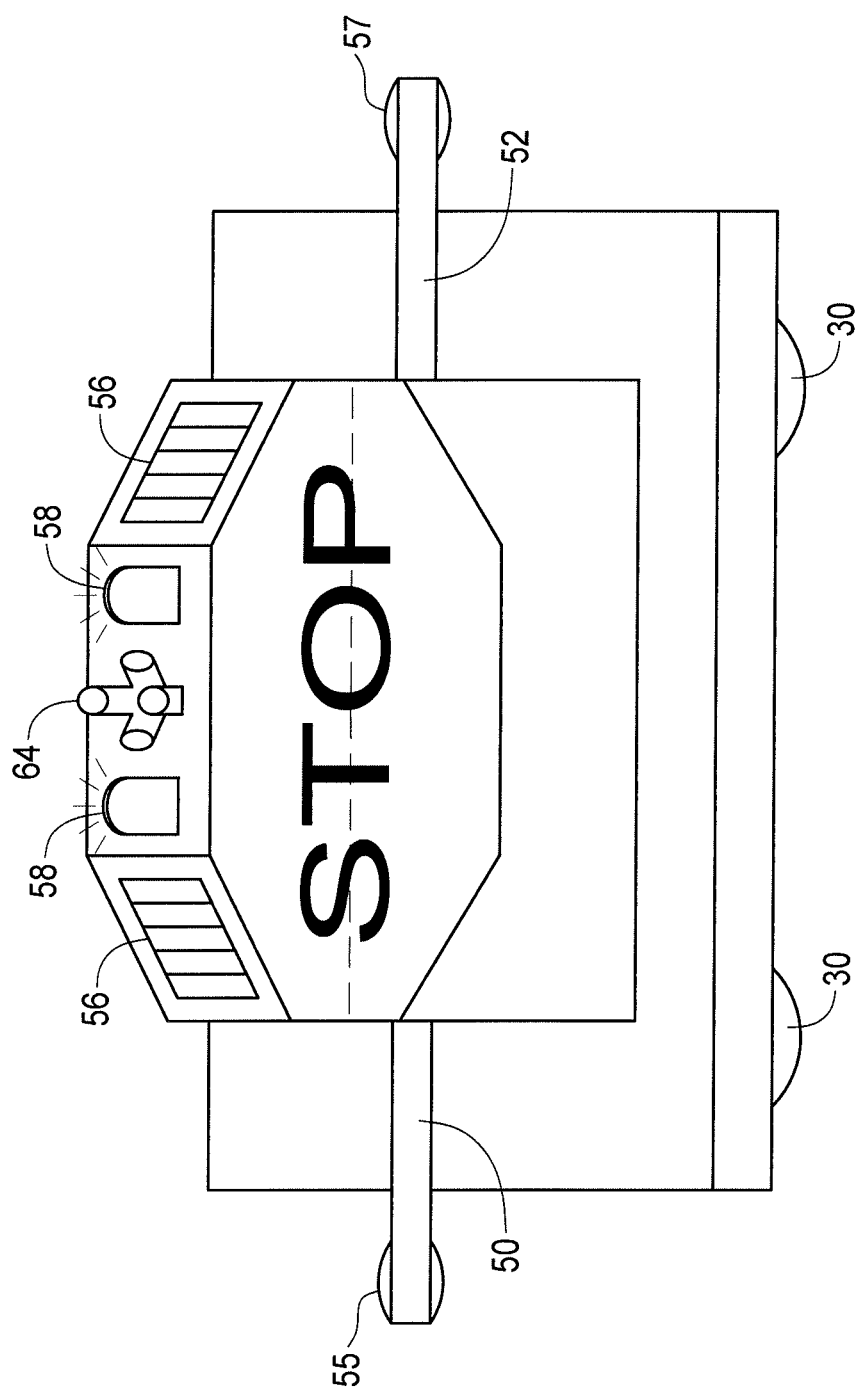
FIG. 3 is a top view of the robot portion of the system of FIG. 2.

FIGS. 2 and 3 are side and top views of the robot. They show the details of the retractable arms 50 and 52 as well as the red and green pedestrian lights 59 and 61. FIG. 3 shows the cameras 64, the warning lights 58, the solar charging panels 56 and lights 55 and 57 on the arms 50, 52.

Figure 4:
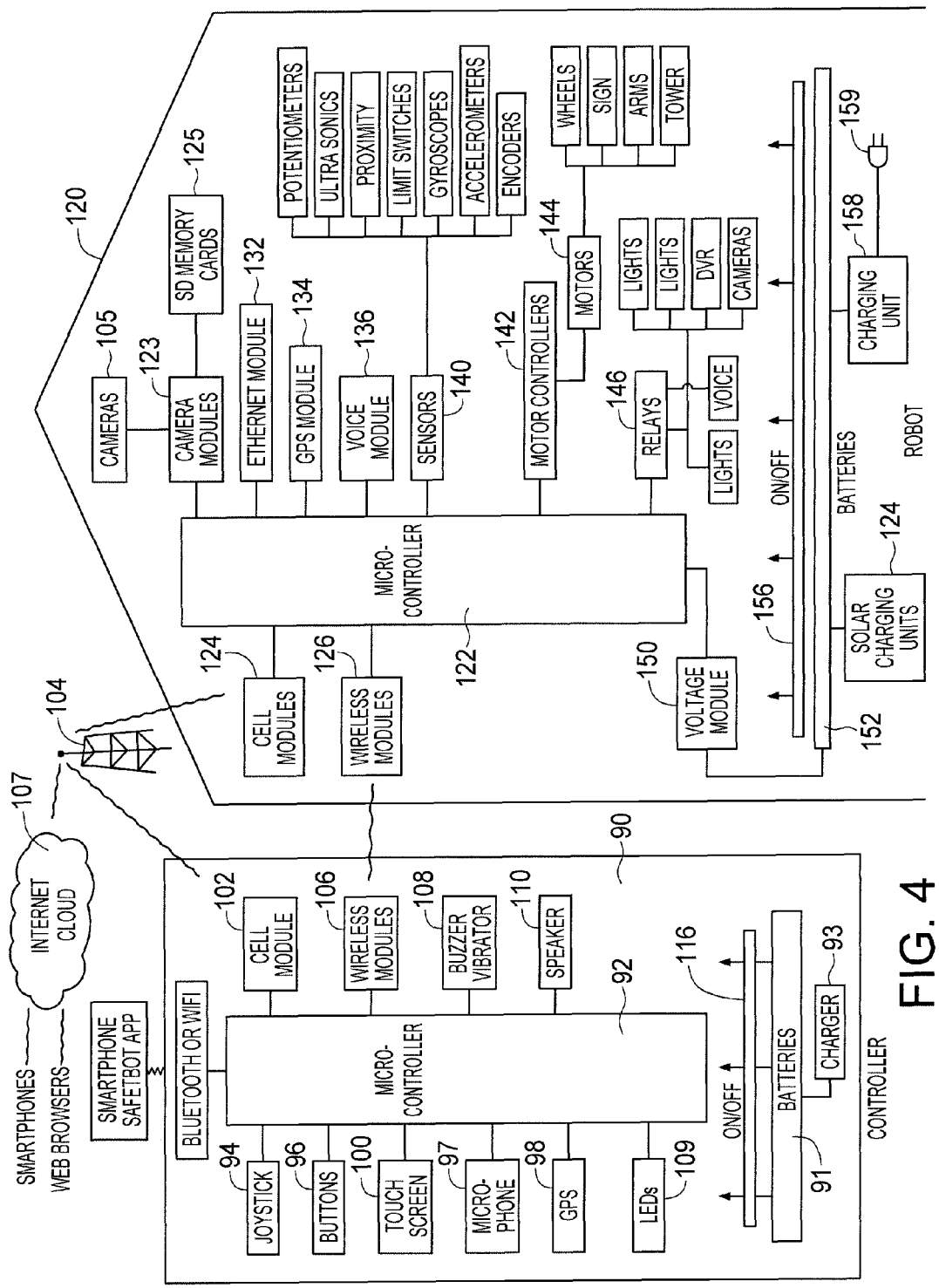
FIG. 4 is a block diagram of the overall control and function of the system of FIG. 1.

FIG. 4 shows the overall control system of the present invention. In FIG. 4, for purposes of clarity, the controller is now referred to at 90. The controller includes a microcontroller, i.e. microprocessor 92, which communicates with individual control modules in the controller via individual interfaces. For instance, there are individual interface elements for the joy stick 94, the various controller buttons 96, and microphone 97. Also, interfacing with the microcontroller is the global positioning unit 98. The GPS unit provides the location of the controller (and the operator) in the event that the controller or the operator cannot otherwise be located. The geospatial location provided by the GPS unit 96 is used in conjunction with the GPS unit on the robot to determine if the robot and the controller are geographically located within a rated range of control.

Two-way communication interfaces included in this embodiment are for, but are not limited to, the touch sensitive touch screen display 100 which communicates with the display on the controller, a cellular communications module 102 which wirelessly communicates with the cellular network, represented at 104, wireless module 106 which communicates with the wireless module on the robot, buzzer/vibrator module 108, and speaker module 110. The cellular communication module provides two-way communications between the controller, the robot and the internet, using the cellular communication network 104. This results in the robot being controllable not only by the controller, but from any internet-connected device including, but not limited to, computers having a web browser, and smart phones. The cellular communication module, when configured to work in conjunction with the cellular network, provides the capability to view real-time video from cameras 105 on the robot and to store video on local servers, SD memory cards 125 or as part of cloud storage represented generally at 107. The wireless modules 126 enable two-way local communication up to one mile between the controller wireless module 106 and the robot, in the embodiment shown. Wireless communication protocols supported include, but are not limited to, Zigbee, Wi-Fi, Bluetooth, 315/433rf, and Nordic, for example. The wireless modules may also be set up to support multiple robots from a single controller. This will enable a traffic management operator to control multiple robots, which is most applicable in the work zone embodiment. The buzzer, LEDs 109, the vibrator and the speaker on the controller enable the robot to activate and provide audible, visual and/or tactile information to the operator in the event of an anomaly of robot operation, which includes the robot being tipped over, or about to be tipped over or in contact with an obstacle. The controller includes a cradle 112 to hold a smartphone device.

It should be understood that the configuration of the various modules to implement the functional elements are conventional and hence are not described in detail. The controller 90 is powered by rechargeable batteries 91, with its own charging unit 93 and is controlled by on/off switch 116.

The robot 120 also includes a variety of individual control modules which interface with microcontroller 122. The individual modules include cellular communication modules 124 which provide two-way communication between the controller 90, the robot 120 and the internet 107. This arrangement enables the robot to be remotely controlled by the controller 90 or any internet-connected device. The cellular communication module 124 provides the ability to transmit video data from the cameras to internet storage. The wireless modules 126 are also configured in the embodiment shown to support multiple robots with a single controller.

The various control modules communicate with microcontroller 122. The camera modules 123 include cameras 105 for interfacing with an SD video memory card 126. The modules further include an Ethernet communication module 132 to provide communication between the microcontroller and a USB device for wired connection to download software on the microcontroller, and a GPS module 134 which operates with the controller to determine operating range relative to the controller and provide geospatial location of the robot. Voice generation module 136 communicates with speaker 110 on the controller and the speaker on the robot to provide remote generation of audible messages. There are also sensor modules, referred to as a group at 140, discussed above and shown in FIG. 4. The microcontroller 122 interfaces with motor controller 142 so as to control the drive motors 144. The motors 144 are used to drive the wheels, deploy the arms, raise and lower the signage structure and change the message of the signs. The microcontroller 122 also interfaces with relays 146 to remotely control the cameras, the red and green LED lights, the lights on the extending arms, the various lights and the audible message speakers.

The microcontroller further interfaces with the voltage module 150 which communicates with batteries 152 to monitor and remotely provide battery charging information to the controller. The robot also includes an on/off switch 156. The microcontroller 122 further interfaces with solar charging module 124 to provide continuous charging to the batteries as well as status thereof to the controller.

A battery charging unit 158 is connected to the batteries via an electrical cord and plug 159 which extends from the robot to a 110 volt outlet, providing a charging capability in addition to the solar charging module 124.

Figure 5A:
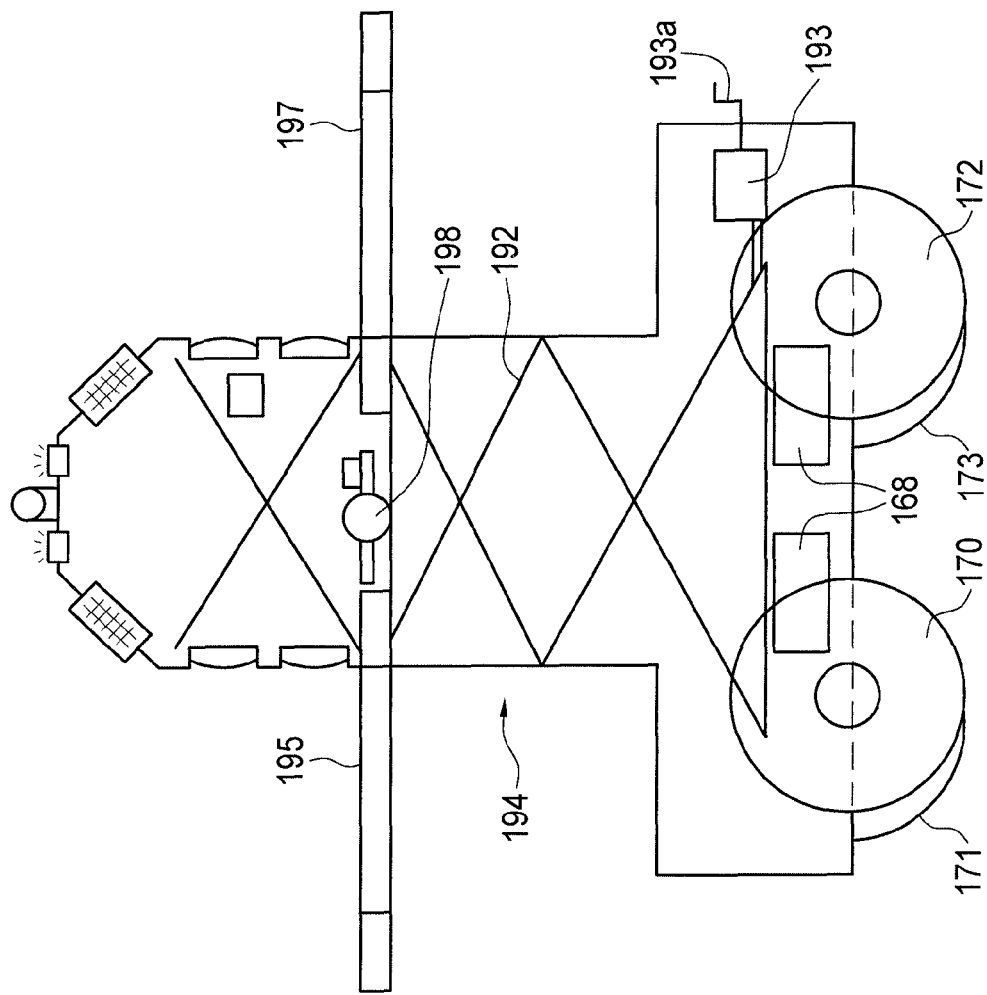
FIG. 5A is an elevational view showing the mechanical components of the robot portion of the system of FIG. 1.
Figure 5B:
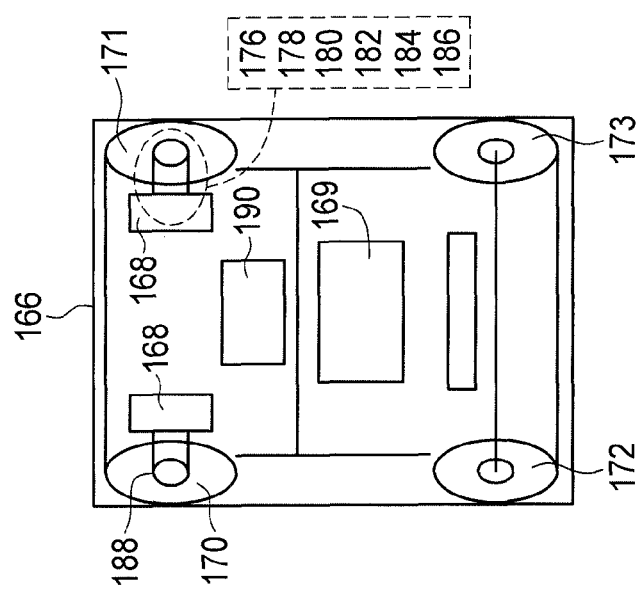
FIG. 5B is a bottom view of the system for moving the robot.

FIGS. 5A and 5B are side, elevational and bottom views showing the mechanical structure of the management system. Frame 166 is constructed of metal to provide structural integrity. Connected to frame 166 are various components of the drive train, including two motors 168-168, for wheels 170 and 171, with transmissions 176, gear boxes 178, drive belts 180, chains 182, axles 184 and bearings 186 being represented together. The other two wheels 172 and 173 are free wheeling, although they could be motor driven as well. The two or four powered wheels have rubber pneumatic tires. The motors for the powered wheels are sealed and are connected using hub connecters 188. The hubs 188 allow for quick assembly and replacement of the motors, wheels and tires. The robot is controlled by motor controllers and associated software which provides steering maneuverability, either like a car or in operation like a tank, wherein with a left movement the right drive motor turns clockwise while the left drive motor turns counterclockwise.

Connected to the frame 166 is a holder 190 for the batteries, the battery charging units and a holder 169 for the electronic elements. The batteries for the robot are charged by an onboard 12-volt charging unit that plugs into an external 110-volt power source. The charging unit stops once the battery is fully charged. The batteries are also charged by the solar panels when exposed to light. The duration of charge is a function of the particular battery chosen by the user and environmental conditions such as the amount of sunlight available.

Attached to frame 166 is a telescoping scissor structure 192 which is constructed of metal and with a motor 193 raises and lowers the signage portion 194. The scissors structure can also be raised and lowered manually via a crank 193a. FIG. 5A also shows arms 195 and 197, and motors 198 to deploy and retract the arms.

Figure 6A:
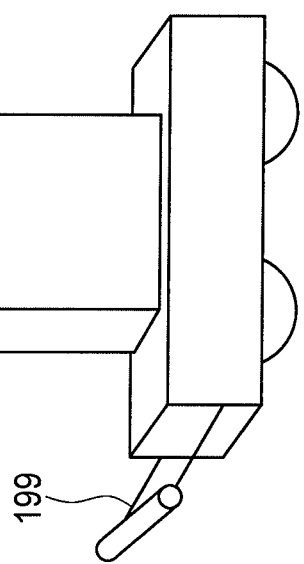
FIGS. 6A and 6B are perspective views showing the collapsible characteristic of the robot portion of the system of FIG. 1.
Figure 6B:
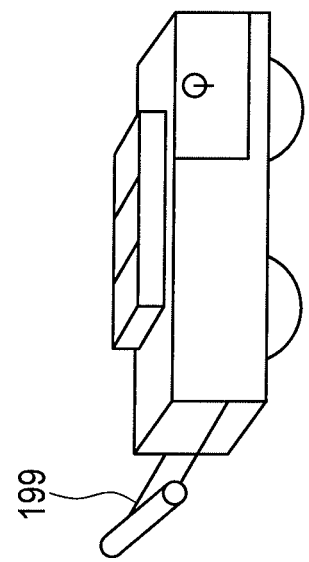

FIG. 6 shows a front view of the robot in its two different states, upright in FIG. 6A with handle 199 retracted and collapsed in FIG. 6B with handle 199 extended.

Figure 7:
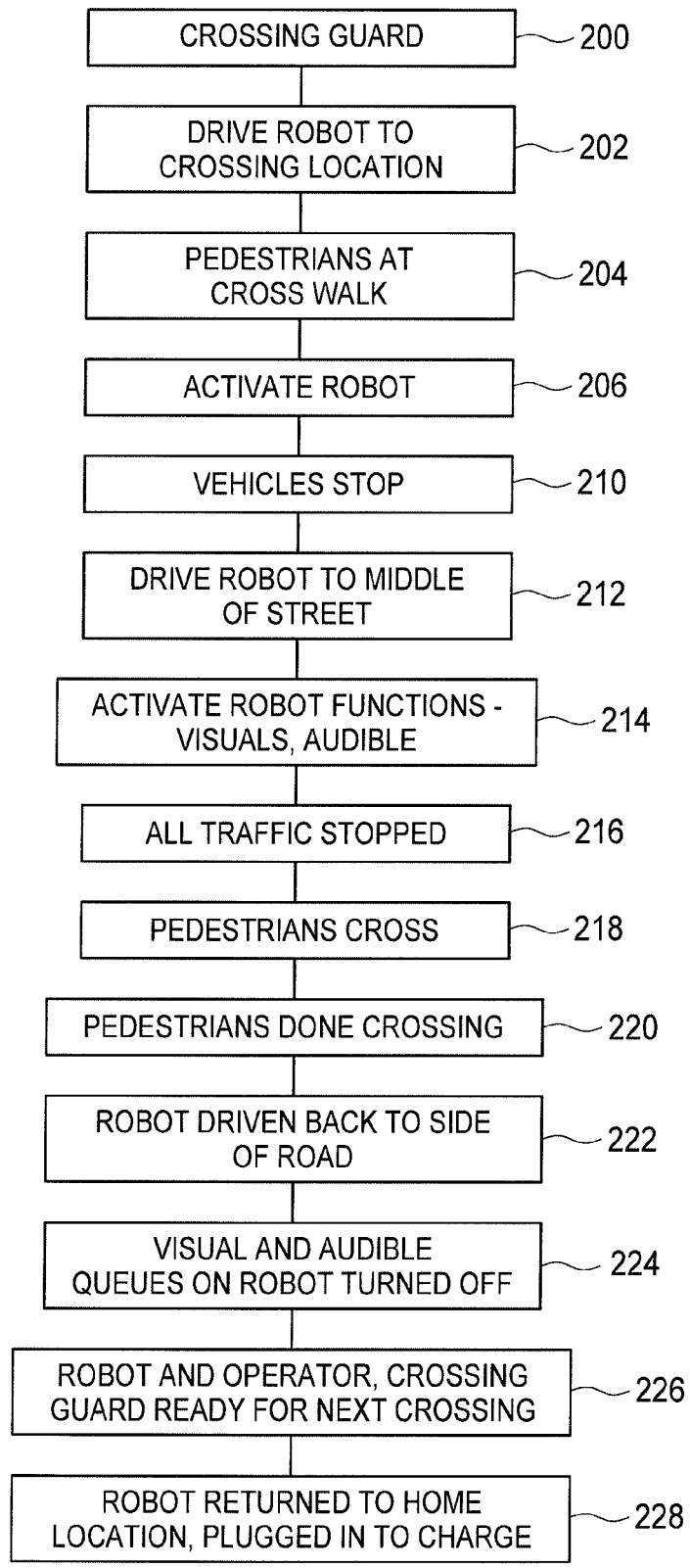
FIG. 7 is a basic flowchart showing the sequence of functions of the system of FIG. 1.

FIG. 7 shows a sequence of functions/operations for the traffic management system of the present invention for use in a crosswalk. A crossing guard, represented at 200, uses the controller to drive the robot to the crossing location, represented at 202. When pedestrians are present at the crosswalk, shown at 204, the operator activates the robot, which is at the side edge of the crosswalk, to alert vehicle traffic, shown at 206. When traffic stops, shown at 210, the robot is driven to the middle of the street, shown at 212, where robot functions are activated such as extension of the arms, various lights, audible sounds, etc., shown at 214. At this point, traffic being stopped is confirmed, shown at 216, the pedestrian lights are changed from red to green and the pedestrians cross the street, at 218. When the pedestrians have completed crossing, as shown 220, the robot is driven back to the side of the road at 222, where the visual and audible capabilities are turned off, at 224. At this point, the robot and the operator are both back at the side of the crossing, ready for the next pedestrians, at 226. At the end of the crossing time, the robot is returned to its home location and plugged in for charging, as shown at 228.

Figure 8:
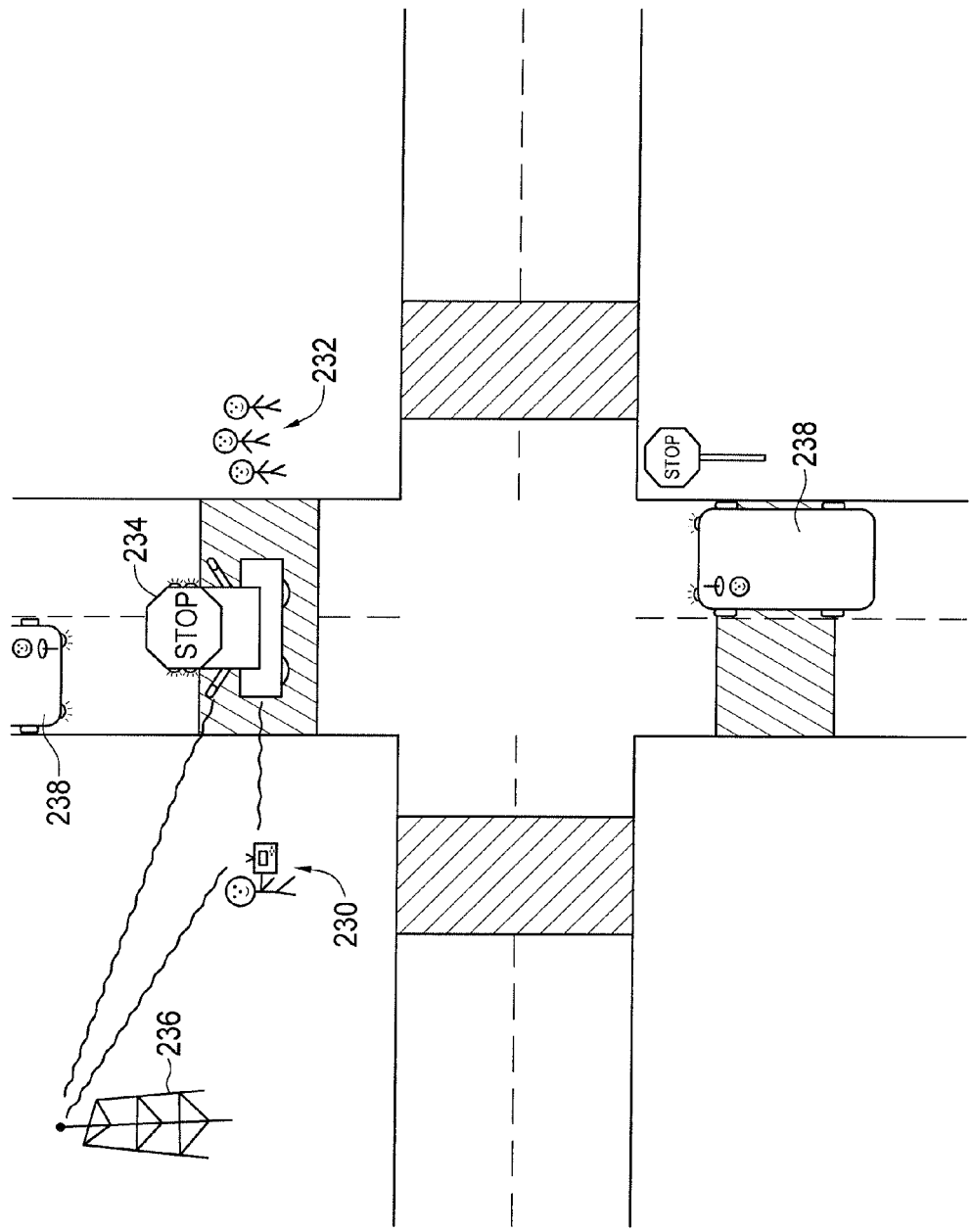
FIG. 8 is a diagram illustrating the actual use of the system of FIG. 1 for a crosswalk.

FIG. 8 shows a visual representation of the actual use of the system for crosswalks, such as at a school. The operator with the controller is shown at 230. Pedestrians are represented at 232, while the robot is represented at 234, in the crosswalk. Communication is accomplished directly from the controller to the robot, or through cell tower 236. The vehicles stopped by the robot are represented at 238. When the pedestrians are safely across, the robot is moved back to the side of the crosswalk.

Figure 9:
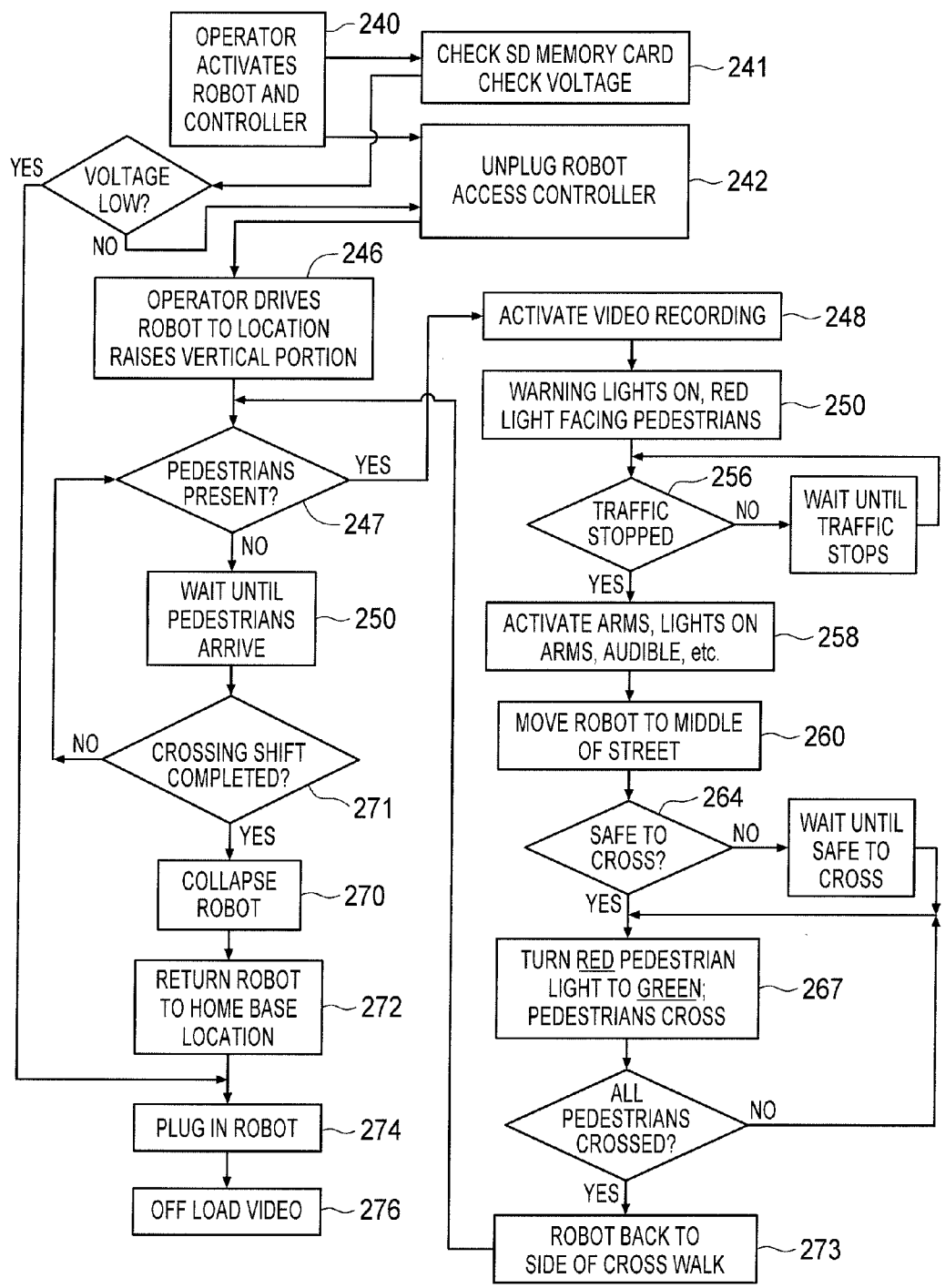
FIG. 9 is a flowchart showing the operation of the control portion of the system of FIG. 1.

FIG. 9 is a flowchart showing the operation of the traffic management system for a school crossing embodiment in detail. In a first step, at 240, the school crossing zone guard, referred to hereinafter as the operator, activates the robot and the controller at the home base with the on/off switches. Checks are made of the operating status of the robot, including checking the voltage level and the memory space on the SD card for recording at 241. If OK, the operator then unplugs the battery charging unit and accesses the controller, at 242. The operator then drives the robot to the crosswalk and uses the controller to activate the scissor structure on the robot, shown at 246. This raises the signage portion to its fully extended position, as shown in FIG. 5. If pedestrians are present (decision point 247), the video recording is activated, shown at 248; the pedestrian-control red and green lights on the side of the robot, the cameras, and the warning lights are all activated, at 250. This action alerts motorists and pedestrians that the robot is ready for use to assist in providing safe crossing for pedestrians.

If there are no pedestrians present, the operator waits until pedestrians are present. When pedestrians are present, and the red lights are on, the motorists are alerted that the robot is preparing to enter the street, signaling that they must stop for safe crossing of the pedestrians. When traffic is stopped, at 256, the operator deploys the arms, and the lights and the audible capability (voice message) are actuated, at 258. The operator then uses the joy stick on the controller to move the robot into the middle of the street, at 260. A decision point at 264 is whether it is safe for pedestrians to cross. The operator waits until it is safe to cross, at 265. If yes, the operator remotely turns off the pedestrian red lights and illuminates the pedestrian green lights and the pedestrians cross, at 262. The voice message "proceed with caution" is activated. Once all the pedestrians have finished crossing the street, shown at decision point 267, the operator uses the controller to remotely reverse the previous actions, including turning off the green pedestrian light, turning on the red pedestrian light, turning off the audible message from the speaker and navigates the robot back to the starting position at the side of the street at 273. The arms 11 are then retracted, at which time the lights on the arms automatically turn off. The operator then waits until there are more pedestrians and the process is repeated, until the crossing shift, i.e. time, is completed, at 271. At that point, the robot is collapsed, at 270 and the robot is returned to base, at 272, where the robot is plugged into the charging unit, at 274, and the video downloaded from the memory storage to another memory device, at 276. The controller logs out of the system, using the screen, turning off the robot, using its on/off switch, and the controller, using its on/off switch, and returning the controller to the locked storage location on the robot.

During the time that the robot is in use, the battery on the robot is being charged by the solar panel in combination with the solar charging unit. During this time, the digital video recording can be running, recording the entire duration of the use of the robot, including the travel of the robot to and from the crosswalk and all of the pedestrian crossings.

Figure 10A:
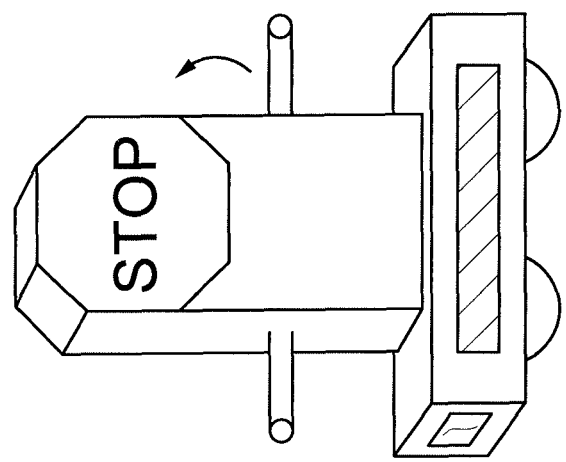
FIGS. 10A-10C show a sequence of messages provided by the present system for control of traffic in work zones.
Figure 10B:
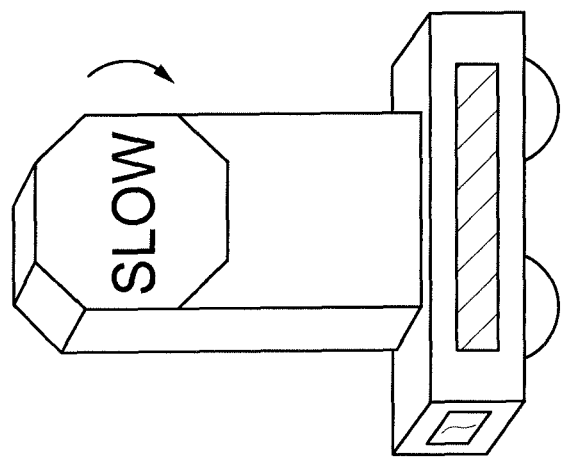
Figure 10C:
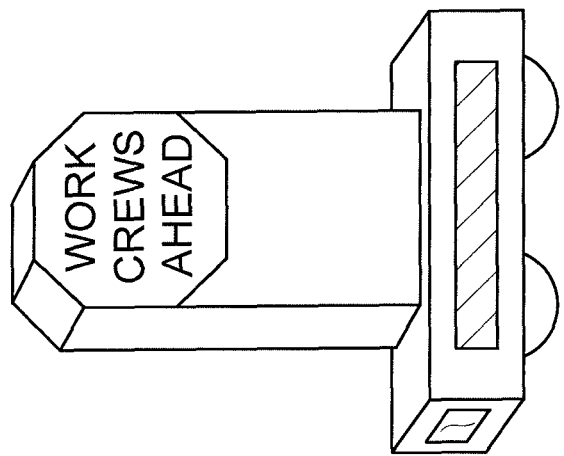

FIG. 10 shows the signage on the robot in a work zone. It can include, for instance, changing signage, as shown in FIGS. 10A and 10B for a command, or just a warning, as shown in FIG. 10C.

Figure 11:
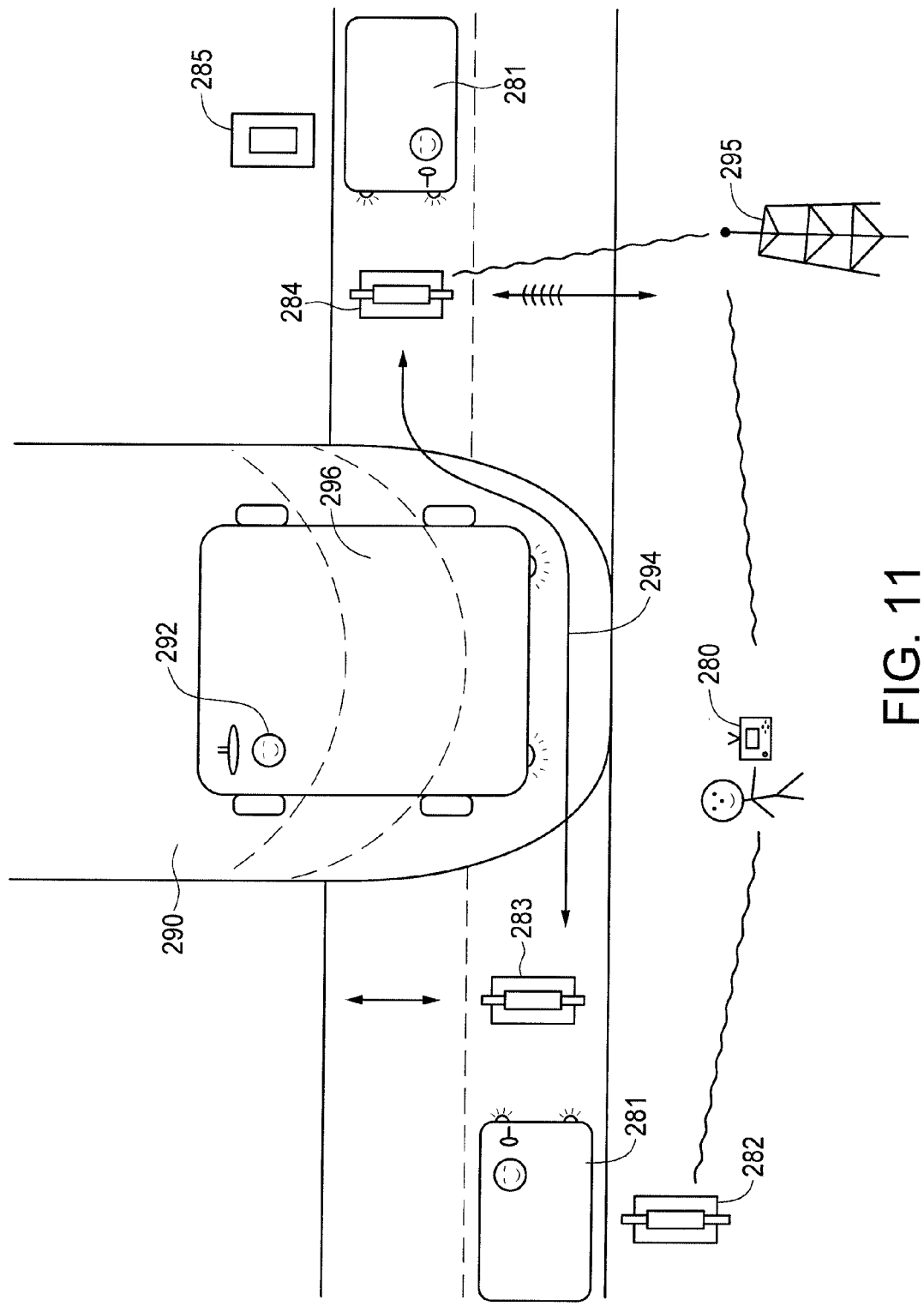
FIG. 11 is a diagram illustrating use of the present system for work zones.

FIG. 11 is a visual representation of the traffic and pedestrian management system in a work zone. An operator 280 with a controller uses the robots to manage traffic to provide safe passage through the work zone by motorists 281. The operator 280 remotely drives robots 282-285 to the sides of the street. All four robots can be controlled by one operator 280 and one associated controller. In typical operation, two robots, for example robots 282, 285, are deployed by the side of the road to provide initial warning to motorists approaching the work zone. These robots are remotely maneuvered to a location at the side of the roadway, but can be several hundred or even several thousand feet prior to the actual construction zone. The signage on these robots can be warnings in nature, i.e. work crew ahead or one lane ahead. At any time, the operator can remotely perform all of the functions described above with the robot. The operator then positions two other robots, for instance 283 and 284, closer to the work zone. These robots perform the functions of two conventional flaggers. When traffic needs to be stopped in both directions, the operator maneuvers both robots 283 and 284 into traffic lanes, stopping traffic with the robots as opposed to a flagger at the side of the road. This arrangement protects workers in the work zone 290, and enables communication directly with heavy equipment operators 292, as well as providing a path 294 through the work zone, avoiding the heavy equipment 296, as it moves in the work zone during normal operation.

In addition, the individual robots could be deployed as conventional "pilot cars" to guide traffic through the work zone, providing clear and more accurate communication to the motorists along path 294 to follow through the work zone. In the work zone, for example, the robot and the controller can be programmed to perform multiple pre-programmed tasks remotely, using cell tower communication 295, with the operation of a single control button on the controller, changing signage from stop to slow, and vice versa, for instance, activating arms and lights, moving the robots forward or backward a selected distance and starting video monitoring with the cameras. The entire cycle can be easily reversed at any time using the controller.

Figure 12:
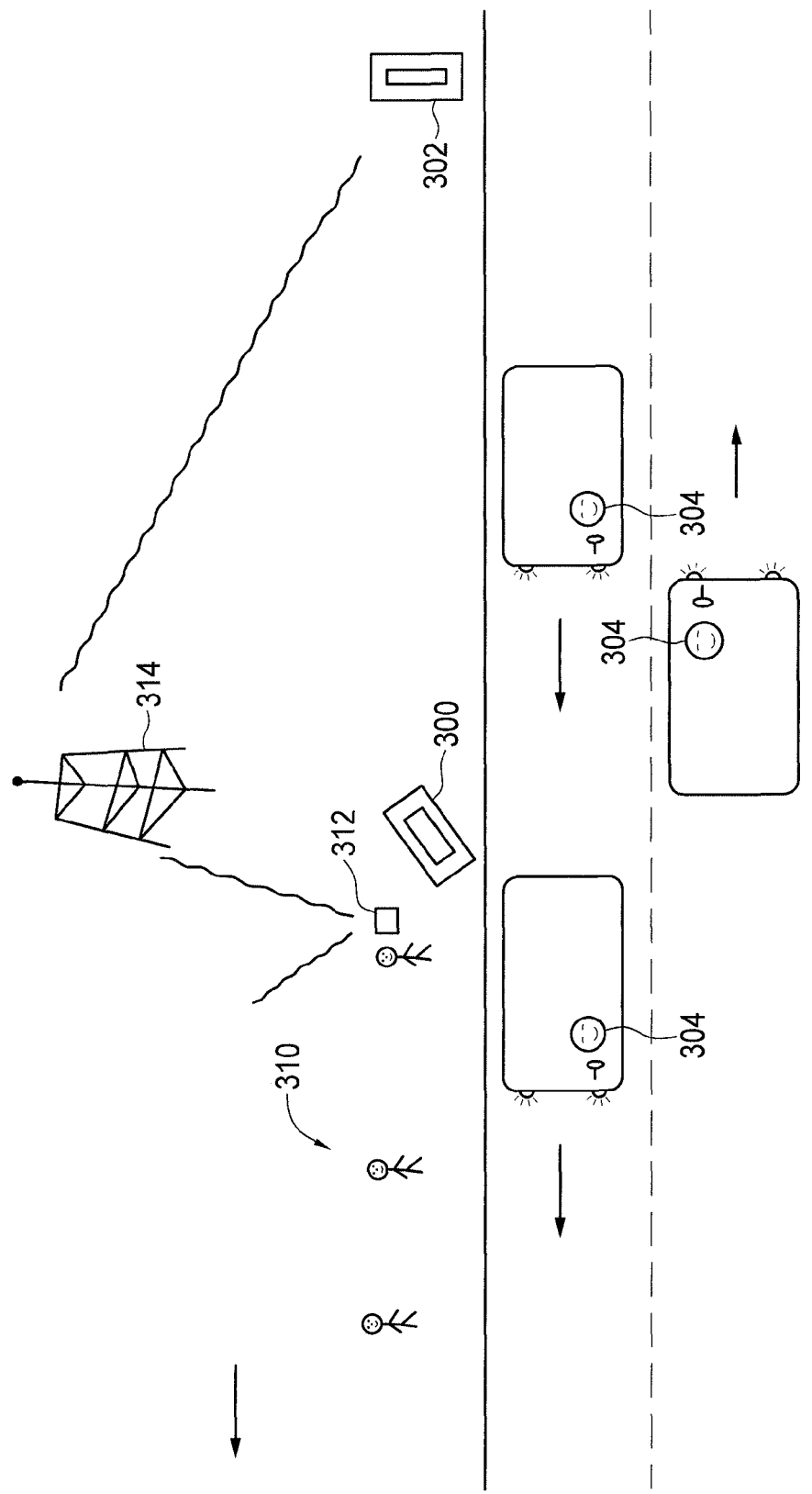
FIG. 12 is a diagram illustrating another use of the present system for work zones.

FIG. 12 shows another embodiment/arrangement for the traffic and pedestrian management system, used as a mobile traffic warning device. In this arrangement, robots 300 and 302 are configured with signage that provides motorists 304 with an indication that work is being conducted on the edge/shoulder of the roadway. Signage could read "road work ahead" or "work crew ahead" or similar message. The robots 300 and 302 have all the capabilities described with respect to the embodiments described above, so as to be quickly and safely repositionable as the work area moves. One of the operators 310, for instance, one of the work crew, could use the associated controller 312 or a web-enabled device to move the robots as the work crew moves by wireless communications from the controller or by cellular communication 314. This results in the work crew being able to keep moving and not have to spend time to reposition the traffic warning robots.

Accordingly, a traffic and pedestrian management system has been described, using a combination of a movable robot and a controller capable of remotely moving the robot into and out of position to manage traffic and provide safety for pedestrians and work crews. The robot has a plurality of warning capabilities, with advisory messages, all activated and deactivated by the controller.

Although a preferred embodiment has been disclosed for purposes of illustration, it should be understood that various changes, modifications and substitutions may be incorporated in the preferred embodiment without departing from the spirit of the invention as defined by the claims which follow:

What is claimed is:

1. A portable, remotely controlled apparatus for control of traffic and/or pedestrians, comprising:
    a movable assembly which includes an upper body portion and a base portion with a wheel assembly supporting the base portion for movement;
    traffic control indicators in the upper body portion, including a first traffic control indicator portion facing in one direction for vehicles and a second traffic control indicator portion facing in another direction for pedestrians attempting to cross a street in which vehicles are permitted to travel, wherein the second traffic indicator control portion is controllable independently of control of the first traffic control indicator portion;
    a motor assembly for driving the wheel assembly; and
    a controller separate from the movable assembly for controlling the movement of the moveable assembly remotely, wherein the motor assembly and the controller assembly are operable to move the apparatus from a starting position at the side of the street where pedestrians are prepared to cross to an operable position in the street in the path of oncoming traffic and then back to the starting position when pedestrians have crossed the street.

2. The system of claim 1, wherein the another direction is approximately 90° to the first direction.

3. The system of claim 1, wherein the first and second traffic control indicator portions are first and second signage portions and wherein the first and second signage portions are illuminated.

4. The system of claim 3, wherein the first signage portion comprises a text message, including a stop sign, or a slow or caution sign or a warning sign concerning workers ahead.

5. The system of claim 3, wherein the second signage portion includes separate red and green illuminable signs.

6. The system of claim 1, wherein the upper body portion is collapsible.

7. The system of claim 1, wherein the movable assembly includes a power source.

8. The system of claim 7, wherein the power source is batteries which are rechargeable by a recharging system.

9. The system of claim 8, wherein the recharging system is solar.

10. The system of claim 1, wherein the movable assembly includes an activatable camera.

11. The system of claim 1, wherein the movable assembly includes remotely activatable speakers for providing audible information for pedestrians, corresponding to the condition of the second traffic control indicator portion.

12. The system of claim 1, wherein the movable assembly includes a global positioning system for determining the geospatial position of the movable assembly and whether or not the controller is within operating range of the movable assembly.

13. The system of claim 1, wherein the movable assembly includes arms which are deployable and retractable by the controller and wherein the arms include lights on the ends thereof which are illuminated when the arms are deployed.

14. The system of claim 1, wherein the controller includes a joystick for controlling the movement of the movable assembly.

15. The system of claim 1, wherein communication between the controller and the movable assembly is wireless.

16. The system of claim 1, wherein the movable assembly includes sensors for determining the position of the movable assembly relative to an object.

17. The system of claim 1, wherein the movable assembly includes sensors for determining the angle of the movable assembly.

18. The system of claim 10, wherein the movable assembly includes data storage for recording the camera results.

19. The system of claim 1, wherein the controller is a web-enabled device.

20. The system of claim 1, wherein the movable assembly and controller have a size to fit into the trunk of a motor vehicle.

21. The system of claim 1, wherein the wheel assembly includes two powered wheels and two free moving wheels or four powered wheels.

22. The system of claim 1, including sensors to determine and control the speed and direction of the movable assembly.

23. The system of claim 1, wherein the first traffic control indicator position includes at least two different message signs for vehicles.

24. The system of claim 3 including another signage portion identical to the first signage portion facing in an opposing direction from the one direction.

25. A portable, remotely controlled apparatus for control of traffic in traffic work zones, comprising:
a movable assembly which includes an upper body portion, a base portion and a wheel assembly supporting the base portion for movement;
signage in the upper body portion facing in at least one direction, providing advisory text messages including a stop message for driven vehicles in the traffic work zones;
a motor assembly for driving the wheel assembly for moving the movable assembly; and
a controller assembly separate from the movable assembly for remotely controlling the movement of the movable assembly in traffic work zones, wherein the motor assembly and the controller are operable to move the apparatus from a starting position at the side of the traffic work zones into a traffic lane in the traffic work zone in the path of oncoming traffic and then back to the side of the traffic work zone when traffic through the work zone is permitted.

26. A system of claim 4, including a coordinated visual and audible warning and surveillance system for vehicular traffic and pedestrians, including warning lights on the upper body portion; deployable opposing arms extending from opposing sides of the upper body portion with lights on the ends of the deployable arms, a camera which is actuated when the apparatus is operably positioned in the street and actuatable speakers for providing audible information for pedestrians when pedestrians are present.

27. A system of claim 1, wherein the first and second traffic control indicators are different.

28. A system of claim 27, herein the first traffic control indicator includes a stop message in the one direction and in an opposing direction and wherein the second traffic control indicator includes illuminated lights.

* * * * *